(12) United States Patent
Bogdanowicz et al.

(10) Patent No.: US 9,599,994 B1
(45) Date of Patent: Mar. 21, 2017

(54) COLLISIONLESS FLYING OF UNMANNED AERIAL VEHICLES THAT MAXIMIZES COVERAGE OF PREDETERMINED REGION

(71) Applicants: Zbigniew Bogdanowicz, Morganville, NJ (US); Ketula Patel, Kenilworth, NJ (US)

(72) Inventors: Zbigniew Bogdanowicz, Morganville, NJ (US); Ketula Patel, Kenilworth, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 60 days.

(21) Appl. No.: 14/816,653

(22) Filed: Aug. 3, 2015

(51) Int. Cl.
*G01C 23/00* (2006.01)
*G05D 1/00* (2006.01)
*G05D 3/00* (2006.01)
*G06F 7/00* (2006.01)
*G06F 17/00* (2006.01)
*G05D 1/10* (2006.01)
*B64C 39/02* (2006.01)
*B64D 47/08* (2006.01)
*G08G 5/00* (2006.01)
*G08G 5/04* (2006.01)

(52) U.S. Cl.
CPC .......... *G05D 1/104* (2013.01); *B64C 39/024* (2013.01); *B64D 47/08* (2013.01); *G08G 5/0034* (2013.01); *G08G 5/0043* (2013.01); *G08G 5/045* (2013.01)

(58) Field of Classification Search
CPC ........ G05D 1/104; G05D 1/102; G05D 1/101; G05D 1/10; G05D 1/0289; G01S 13/93; G01S 15/93; G01S 17/93; B64C 39/024; B64C 39/028; B64C 2201/00; B64D 47/08; G08G 5/0034; G08G 5/0039; G08G 5/0043; G08G 5/045
USPC ........................................................ 701/1, 3
See application file for complete search history.

(56) References Cited

U.S. PATENT DOCUMENTS 5,340,056 A * 8/1994 Guelman ................ F41G 7/007
244/3.16
5,521,817 A 5/1996 Burdoin et al.
5,728,965 A 3/1998 Fesland
(Continued)

OTHER PUBLICATIONS

Bogdanowicz, Arc-Disjoint and Edge-Disjoint Hamilton Cycles in Circulants with Two Jumps, Graphs and Combinatorics, 2013, 165-171, vol. 29, Springer Publishing, United States.

*Primary Examiner* — Jaime Figueroa
(74) *Attorney, Agent, or Firm* — John P. DiScala

(57) ABSTRACT

Collisionless flight is achieved by overlaying a circulant digraph with certain characteristics over a model of the area to be flown. Each UAV then executes a flight path corresponding to a directed cycle of the circulant digraph where each vertex of the circulant digraph corresponds to two waypoints. The circulant digraph includes more vertices than the number of unmanned aerial vehicles and the number of vertices is divisible by the number of UAVs. Additionally, the circulant digraph has a first jump of 1, a second jump of one less than then number of UAVs. To maximize coverage, each of the vertices of the circulant digraph may then be individually updated such that they satisfy two tests: a convexity test and an isosceles avoidance test. The updated flight path of each UAV may then be relayed from a control station to each UAV.

20 Claims, 13 Drawing Sheets

(56) References Cited

U.S. PATENT DOCUMENTS

| | | | |
|---|---|---|---|
| 6,289,277 B1* | 9/2001 | Feyereisen | G01C 21/005 340/945 |
| 6,317,690 B1* | 11/2001 | Gia | G01S 13/94 340/961 |
| 6,401,038 B2* | 6/2002 | Gia | G01C 21/00 342/65 |
| 7,047,861 B2 | 5/2006 | Solomon | |
| 7,233,859 B2 | 6/2007 | Lundberg | |
| 7,299,130 B2 | 11/2007 | Mulligan | |
| 7,418,320 B1 | 8/2008 | Bodin et al. | |
| 8,086,351 B2 | 12/2011 | Gaudiano et al. | |
| 8,798,922 B2 | 8/2014 | Tillotson | |
| 8,924,069 B1* | 12/2014 | Kaneshige | G05D 1/12 701/23 |
| 8,935,035 B1* | 1/2015 | Bogdanowicz | G08G 1/20 701/26 |
| 9,104,201 B1* | 8/2015 | Pillai | B64C 39/024 |
| 2001/0023390 A1* | 9/2001 | Gia | G01C 21/00 701/301 |
| 2005/0234608 A1* | 10/2005 | Jaillant | G05D 1/0202 701/4 |
| 2010/0004798 A1 | 1/2010 | Bodin et al. | |
| 2010/0228406 A1 | 9/2010 | Hamke et al. | |
| 2011/0226892 A1* | 9/2011 | Crowther | B64C 1/30 244/17.23 |
| 2014/0316616 A1* | 10/2014 | Kugelmass | G05D 1/101 701/8 |
| 2015/0226575 A1* | 8/2015 | Rambo | B64C 39/024 701/523 |
| 2015/0370251 A1* | 12/2015 | Siegel | G05D 1/0027 701/2 |
| 2016/0070265 A1* | 3/2016 | Liu | B64C 39/024 701/3 |
| 2016/0117932 A1* | 4/2016 | Park | G01S 19/39 701/3 |
| 2016/0284221 A1* | 9/2016 | Hinkle | G08G 5/0034 |

\* cited by examiner

US 9,599,994 B1

COLLISIONLESS FLYING OF UNMANNED AERIAL VEHICLES THAT MAXIMIZES COVERAGE OF PREDETERMINED REGION

FEDERAL RESEARCH STATEMENT

The invention described herein may be manufactured, used, and licensed by or for the U.S. Government for U.S. Government purposes.

BACKGROUND OF INVENTION

Field of the Invention

The present invention relates to autonomous vehicles, and more particularly to flight paths of autonomous vehicles.

Related Art

Unmanned Aerial Vehicles (UAVs), also known as drones, are critical in the collaborative engagement, surveillance and monitoring of enemy territory in today's military conflicts and operations. Increasingly, UAVs are also being used in commercial and civilian applications, as well. UAVs are used by law enforcement agencies to monitor and surveille an area, by farmers to monitor crops for pests or water requirements, by scientists to conduct research or by activists to prevent wildlife poaching or other misuse of natural resources.

Additionally, as UAVs become less expensive their use becomes more economical. Where once a single drone may have been deployed a fleet or swarm of drones may be used. However, as the application of UAVs becomes more widespread and the number of UAVs deployed in those applications increases, collision avoidance becomes increasingly important. UAV collisions can result in financial loss, mission failure and possibly even injury or loss of life.

Collision avoidance is currently approached through some combination of location awareness and intricate flight coordination. Each UAV is outfitted with sensors and communication equipment which aids it in determining the location of nearby UAVs and to take actions to avoid collisions. This additional hardware increases the size and cost of the UAV. Additionally, location sensing and intricate flight coordination becomes increasingly complex as the number of UAVs in an area increase. As systems move toward employing thousands of UAVs, flight coordination becomes less realistic. Finally, UAV choice is limited with current collision avoidance schemes as the UAVs must use similar communication protocols to be able to communicate.

Accordingly, there is a need for a cost-effective way of ensuring the collisionless flight of UAVs which does not require the UAV to include collision avoidance sensors or have knowledge and coordination of the flight paths or positions of other UAVs.

SUMMARY OF INVENTION

The present invention relates to a system and method for ensuring collisionless flight of three or more unmanned aerial vehicles (UAVs). Collisionless flight is achieved by overlaying a circulant digraph with certain characteristics over a model of the area to be flown. Each UAV then executes a flight path corresponding to a directed cycle of the circulant digraph where each vertex of the circulant digraph corresponds to two waypoints. The circulant digraph includes more vertices than the number of unmanned aerial vehicles and the number of vertices is divisible by the number of UAVs. Additionally, the circulant digraph has a first jump of 1, a second jump of one less than then number of UAVs. To maximize coverage, each of the vertices of the circulant digraph may then be individually updated such that they satisfy two tests: a convexity test and an isosceles avoidance test. The updated flight path of each UAV may then be relayed from a control station to each UAV.

According to a first aspect of the invention, a method for ensuring collisionless flight of three or more unmanned aerial vehicles over an area comprises the steps of: constructing a circulant digraph representing a portion of the area and assigning each unmanned aerial vehicle a flight path corresponding to an independent directed cycle of the circulant digraph. The circulant digraph includes a number of vertices, a first jump size of one, a second jump size of one less than then number of unmanned aerial vehicles, and an independent directed cycle for each of the three or more unmanned aerial vehicles. The number of vertices is greater than the number of unmanned aerial vehicles and also divisible by the number of unmanned aerial vehicles. Each vertex represents two waypoints.

In a second aspect, a system for ensuring collisionless flight of three or more unmanned aerial vehicles over an area, the three or more unmanned vehicles are assigned a flight path corresponding to an independent directed cycle of a circulant digraph representing the area. The circulant digraph further includes a first jump size of one, a second jump size of one less than the number of unmanned aerial vehicles and a number of vertices such that the number of vertices is greater than the number of unmanned aerial vehicles and the number of vertices is divisible by the number of unmanned aerial vehicles. Each vertex represents two waypoints.

BRIEF DESCRIPTION OF THE DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

DETAILED DESCRIPTION

The present invention relates to a system and method for ensuring collisionless flight of three or more unmanned aerial vehicles (UAVs). Collisionless flight is achieved by overlaying a circulant digraph with certain characteristics over the area to be flown. Each UAV is then assigned to a flight path corresponding to a directed cycle of the circulant digraph where each vertex of the circulant digraph corresponds to two waypoints. To maximize coverage, each of the vertices of the circulant digraph may then be updated such that they satisfy two tests: a convexity test and an isosceles avoidance test. The updated waypoint may then be relayed from a control station to each UAV.

Advantageously, each UAV does not require any collision avoidance sensors or knowledge of the position of other UAVs in the area. This reduces the cost, size and complexity of the UAVs. Further, each UAV does not require communication with the other UAVs. Accordingly, the UAVs may be a heterogeneous mix or various types of UAVs. Since each UAV flies according to the same flying rules, the solution is easily scalable to systems requiring large amounts of UAVs, such as swarm applications. As each UAV flies according to flying rules, the decision making is distributed among the UAVs. Finally, as each vertex of the circulant digraph is visited by two UAVs, the system provides beneficial redundancy as a loss of one UAV would not reduce the coverage area of the group.

Figure 1:
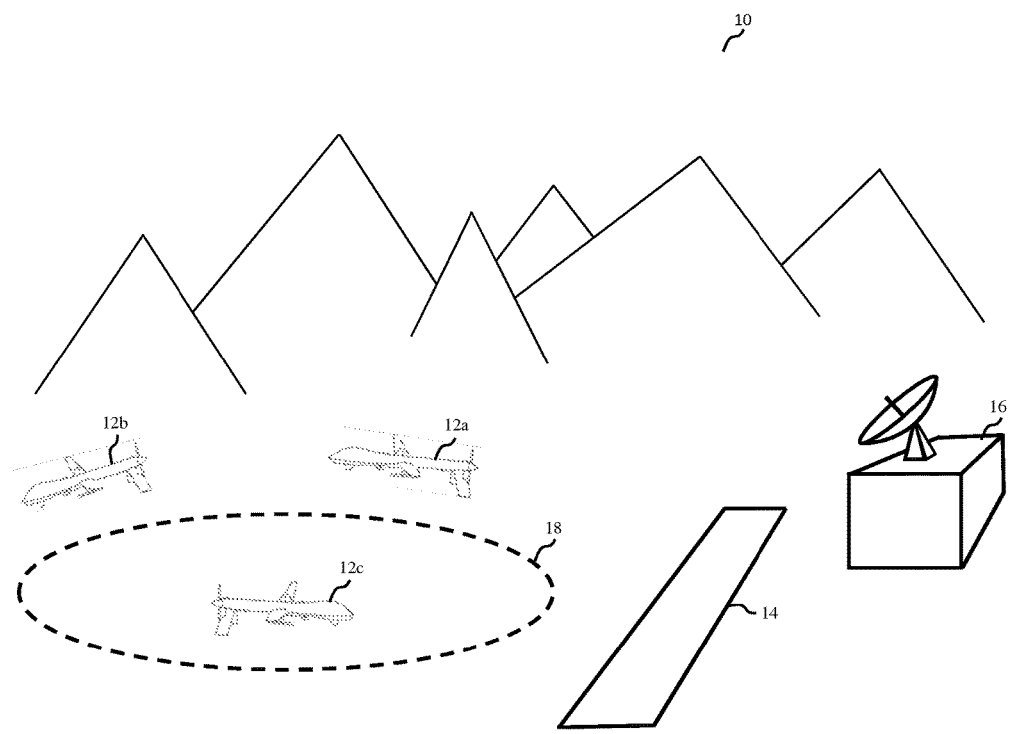
FIG. 1 shows a system for ensuring collisionless flight of unmanned aerial vehicles (UAVs), in accordance with one illustrative embodiment of the invention.

FIG. 1 shows a system for ensuring collisionless flight of unmanned aerial vehicles (UAVs), in accordance with one illustrative embodiment of the invention. The system 10 comprises three or more UAVs 12, a maintenance point 14 and a control station 16.

The three or more UAVs 12 fly flight paths above an area of interest 18. The flight paths are determined by overlaying a circulant digraph meeting certain criteria over the area of interest 18 and assigning waypoints to each of the vertices of the circulant digraph. Each of the UAVs 12 flies a flight pattern corresponding to a directed cycle of the circulant digraph. To maximize coverage, the vertexes (and therefore the waypoints) may be updated. To ensure collisionless flight, the adjusted digraph must retain convexity and as will be described below, no crossing arcs of the digraph may form a pair of sides of an isosceles triangle at their intersection.

The system may be employed in a variety of surveillance, reconnaissance and monitoring applications such as military applications, law enforcement, search and rescue, reconnaissance, natural resource and animal conservation, motion picture filming, scientific research, journalism, surveying and crop monitoring and servicing.

Each of the UAVs 12 begin its flight path at the maintenance point and returns based on mission completion, energy requirements or upon receiving a command from the control station for any other reason such as hostile enemy activity. The control station 16 transmits initial waypoints, updated waypoints or other information to the UAVs 12 either in flight or while at the maintenance point 14. The control station 16 transmits the information via a wireless radio frequency (RF) signal or some other wireless signal.

Each of the UAVs 12 is assigned a flight path corresponding to a directed cycle in a circulant digraph with certain characteristics, as detailed below. Circulant digraphs are a type of directed graph, or a set of vertices connected by arcs or directed edges of set jump sizes and which have a direction associated with them. Circulant digraphs are described in further detail in "Decomposition of circulant digraphs with two jumps into cycles of equal lengths" by Z. R. Bogdanowicz (Discrete Applied Math., Vol. 180 (1), 2015, 45-51) and "Arc-disjoint and edge-disjoint Hamilton cycles in circulants with two jumps" by Z. R. Bogdanowicz (Graphs and Combinatorics, Vol. 29, 2013, 165-171), the contents of which are incorporated herein.

Figure 2:
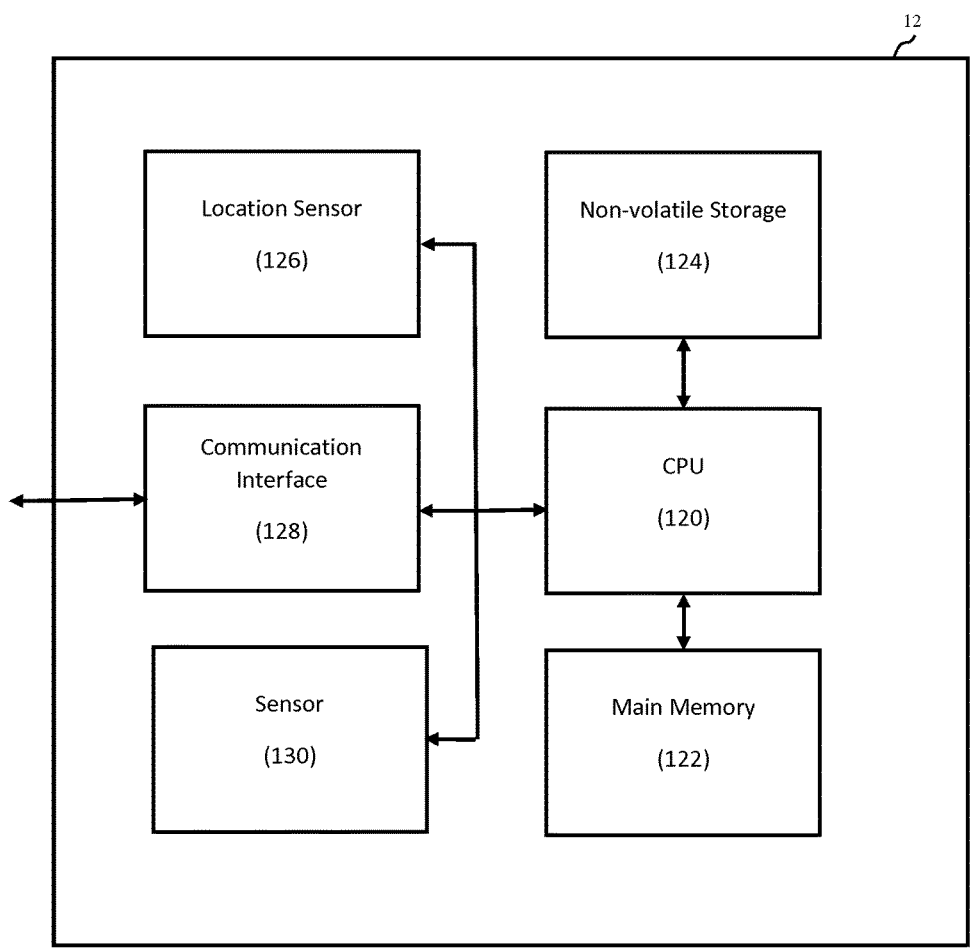
FIG. 2 is a functional block diagram of the UAV, in accordance with one illustrative embodiment of the invention.

FIG. 2 is a functional block diagram depicting the UAV, in accordance with an illustrative embodiment of the invention. The UAV 12 includes at least one central processing unit (CPU) 120. For example, the CPU 120 may represent one or more microprocessors, and the microprocessors may be "general purpose" microprocessors, a combination of general and special purpose microprocessors, or application specific integrated circuits (ASICs). Additionally or alternatively, the CPU 121 may include one or more reduced instruction set (RISC) processors, or related chip sets. The CPU 121 may provide processing capability to execute an operating system, run various applications and executables, and/or provide processing for one or more of the techniques described herein.

A main memory 122 may be communicably coupled to the CPU 120, which may store data and executable code. The main memory 122 may represent volatile memory such as RAM, but may also include nonvolatile memory, such as read-only memory (ROM) or Flash memory. In buffering or caching data related to operations of the CPU 120, the main memory 122 may store data associated with executables running on the UAV 12.

The UAV 12 may also include nonvolatile storage 124. The nonvolatile storage 124 may represent any suitable nonvolatile storage medium, such as a hard disk drive or nonvolatile memory, such as Flash memory. Being well-suited to long-term storage, the nonvolatile storage 124 may store data files, software, wireless communication information and identity information.

It should be appreciated that data associated with autonomous flight may be saved in the nonvolatile storage 124. Non-volatile storage 124 includes one or more software engines operable to enable the execution of an autonomous flight program and navigation to a sequence of waypoints as well as perform other operations. Depending upon implementation, various aspects of teachings of the present invention may be implemented in a single software engine, in a plurality of software engines, in one or more hardwired components or in a combination of hardwired and software systems.

In addition to one or more software engines, non-volatile storage 124 also includes one or more data storage areas. Data storage area is operably associated with the main memory 122 and CPU 120. Data storage area of non-volatile storage 124 may be leveraged to maintain data concerning the coordinates of waypoints as well as other information pertinent to the execution of a flight plan. Data storage area, or portions thereof, may also be utilized to store myriad other data.

In certain embodiments, the UAV 12 may include location sensing circuitry 126. The location sensing circuitry 126 may represent global positioning system (GPS) circuitry, but may also represent one or more algorithms and databases, stored in the nonvolatile storage 124 or main memory 122 and executed by the CPU 120, which may be used to infer location based on various observed factors.

One or more communication interfaces 128 may provide connectivity for the UAV 12. The communication interface 128 enables the reception of wireless RF signals and in embodiments, the transmission of wireless RF signals. The communication interface 128 may include a local area network (LAN) interface. For some embodiments of the UAV, the communication interfaces may include the capability to connect directly to a wide area network (WAN). The LAN interface and WAN interface may represent an interface to a wireless LAN or wireless WAN. Advantageously, as each UAV only requires communication with the control station, bandwidth requirements are minimized.

One or more sensors 130, or payloads, provide functional capabilities to the UAV 12. The UAVs 12 may include a variety of sensors according to the application for which it is being employed. Sensors which may be outfitted on the UAV 12 include electro-optical sensors, infrared (IR) sensors, laser sensors such as LIDAR sensors, radar sensors, electronic warfare sensors, atmospheric sensors and other research sensors. In an embodiment of the invention, the UAV 12 includes a situation awareness sensor in the form of an infrared or optical image sensor. The image sensor is configured for sensing the electromagnetic radiation (i.e. visible light or infrared radiation) and either recording or transmitting the sensed information.

Each UAV 12 flies a flight path determined by waypoints and IDs assigned by the control station 16. The control station 16 is a central location configured for receiving one or more inputs and determining and transmitting waypoints as well as system IDs including UAV and waypoint IDs. The control station 16 comprises a computer device 160 coupled to a communication interface 161 configured for communicating with the one or more UAVs 12. The control station 16 may be operated by one or more operators either directly or remotely or may be an autonomous or semi-autonomous station.

Figure 3:
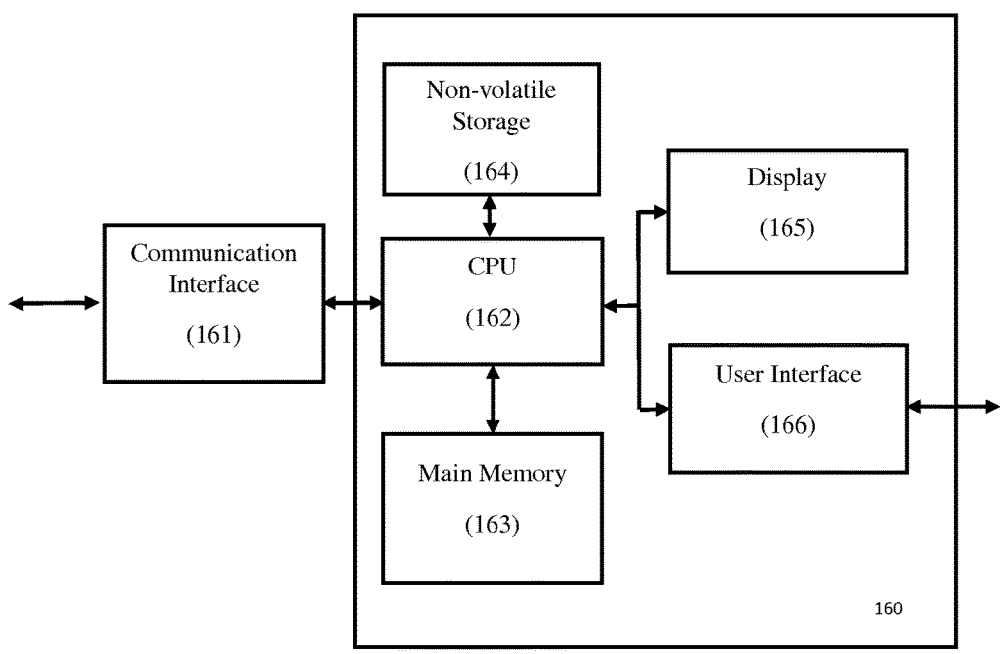
FIG. 3 is a functional block diagram of a control station, in accordance with one illustrative embodiment of the invention.

FIG. 3 is a functional block diagram of the computer device and communication interface, in accordance with one illustrative embodiment of the invention. The computer device 160 is configured for receiving inputs in the form of coordinates of an area of interest 18 and determining waypoints and assigning system IDs. The computer device 160 may be a personal computer, tablet computer, mobile phone or any other device comprising a central processing unit and memory.

The computing device includes at least one central processing unit (CPU) 162. For example, the CPU 162 may represent one or more microprocessors, and the microprocessors may be "general purpose" microprocessors, a combination of general and special purpose microprocessors, or application specific integrated circuits (ASICs). Additionally or alternatively, the CPU 162 may include one or more reduced instruction set (RISC) processors, or related chip sets. The CPU 162 may provide processing capability to execute an operating system, run various applications and executables, and/or provide processing for one or more of the techniques described herein.

A main memory 163 may be communicably coupled to the CPU 162, which may store data and executable code. The main memory 163 may represent volatile memory such as RAM, but may also include nonvolatile memory, such as read-only memory (ROM) or Flash memory. In buffering or caching data related to operations of the CPU 162, the main memory 163 may store data associated with executables running on the UAV 12.

The computer device 160 may also include nonvolatile storage 164. The nonvolatile storage 164 may represent any suitable nonvolatile storage medium, such as a hard disk drive or nonvolatile memory, such as Flash memory. Being well-suited to long-term storage, the nonvolatile storage 164 may store data files, software, wireless communication information and identity information.

It should be appreciated that data associated with overlaying circulant digraphs and assigning waypoints and system IDs may be saved in the nonvolatile storage 164. Non-volatile storage 164 includes one or more software engines operable to enable the construction of a circulant digraph and assignment of waypoints and system IDs as well as perform other operations. Depending upon implementation, various aspects of teachings of the present invention may be implemented in a single software engine, in a plurality of software engines, in one or more hardwired components or in a combination of hardwired and software systems.

In addition to one or more software engines, non-volatile storage 164 also includes one or more data storage areas. Data storage area is operably associated with the main memory 163 and CPU 162. Data storage area of non-volatile storage 164 may be leveraged to maintain data concerning the coordinates of waypoints as well as other information. Data storage area, or portions thereof, may also be utilized to store myriad other data.

A display 165 may display images and data for the computer device 160. The display 165 may be any suitable display, such as liquid crystal display (LCD), a light emitting diode (LED) based display, an organic light emitting diode (OLED) based display, a cathode ray tube (CRT) display, or an analog or digital television. In some embodiments, the display 165 may function as a touch screen through which a user may interact with the computer device 160.

The computer device 160 may further include a user interface 166. The user interface 166 may represent indicator lights and user input structures, but may also include a graphical user interface (GUI) on the display 165. In practice, the user interface 166 may operate via the CPU 162, using memory from the main memory 163 and long-term storage in the nonvolatile storage 164. In an embodiment having a GUI, the user interface 166 may provide interaction with interface elements on the display 165 via certain user input structures, user input peripherals such as a keyboard or mouse, or a touch sensitive implementation of the display. The user may interact with the graphic user interface via touch means on a touch screen, input means via one or more keyboard buttons, mouse buttons etc., or voice instructions.

One or more communication interfaces 161 may provide connectivity for the computer device 160. The communication interface 161 enables the transmission of wireless RF signals and in some embodiments, the reception of wireless RF signals. The communication interface 161 may include a local area network (LAN) interface. For some embodiments of the control station 16, the communication interfaces 161 may include the capability to connect directly to a wide area network (WAN). The LAN interface and WAN interface may represent an interface to a wireless LAN or wireless WAN.

Figure 4:
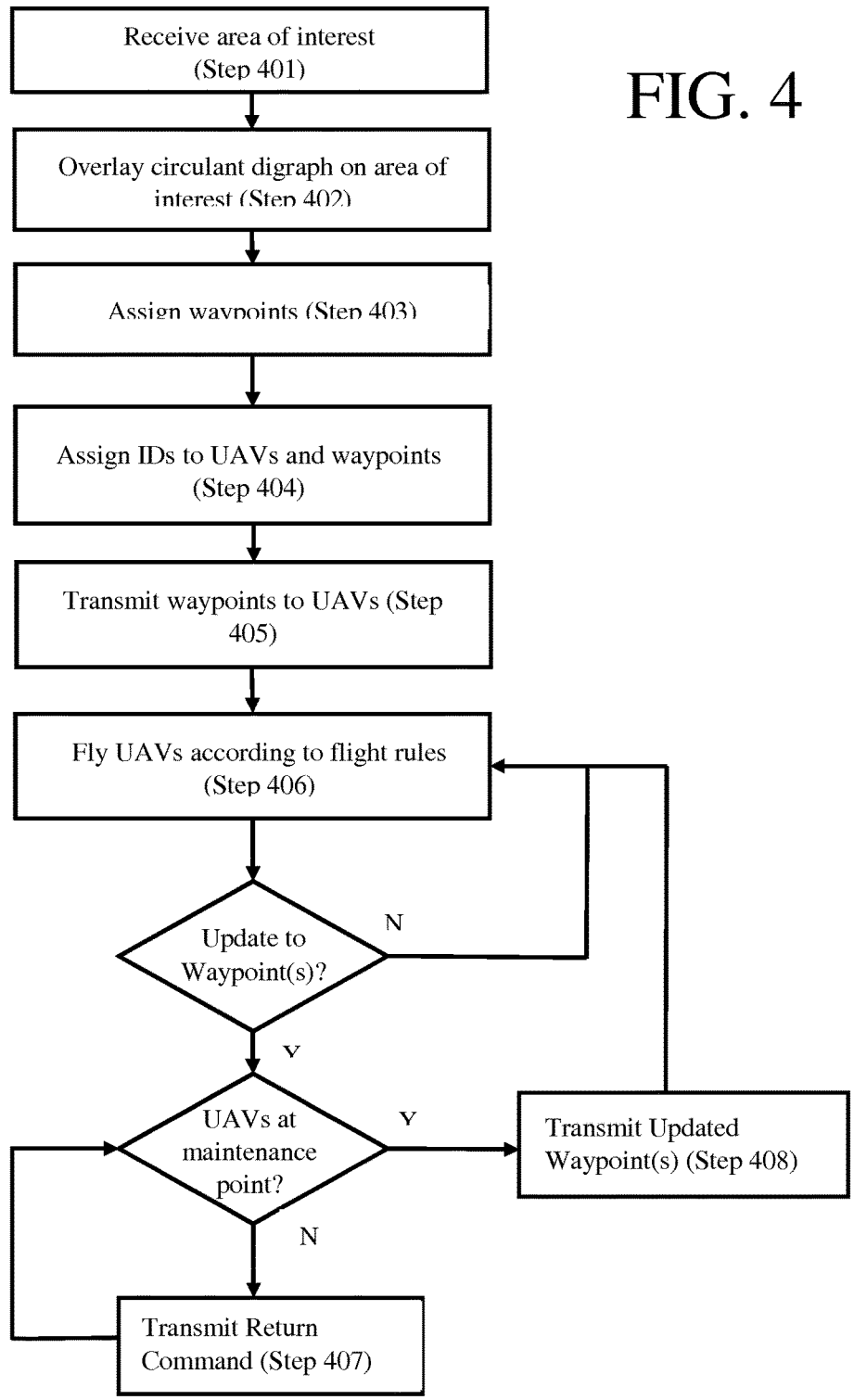
FIG. 4 is a flowchart illustrating steps for a method of ensuring collisionless flight of UAVs, in accordance with one illustrative embodiment of the invention.

FIG. 4 is a flowchart illustrating steps for a method of ensuring collisionless flight of UAVs, in accordance with one illustrative embodiment of the invention.

In step 401, the area of interest 18 is determined at the control station 16. The area of interest 18 is the area in which the UAVs 12 will fly over to execute their mission function. For example, the area of interest 18 may be an area to be surveilled with the infrared imaging sensors of the UAVs 12. In one embodiment, an operator inputs the area of interest 18 to the computer device 160, such as by highlighting an area of a displayed map with a GUI or providing a set of coordinates bounding an area. The operator may input the area of interest directly at the computer device or may transmit the input from a remote location. In an alternative embodiment, the computer device may select an area of interest based on one or more predefined parameters.

In step 402, a circulant digraph is overlayed on a model of the area of interest 18. The control station 16 overlays a circulant digraph based on the area of interest 18 and the number of UAVs 12 and overlays it on the area of interest 18. A circulant digraph is a type of directed graph defined by a number of vertices distributed on a circle and a collection of directed edges of defined jump sizes connecting the vertices. The directed edges form multiple directed cycles comprised of subgraphs of the circulant digraph.

The circulant digraph is selected based on the number of UAVs 12 being employed in the system. The circulant digraph is of the form: $G=G_n(a1, a2)$ where "n" is the number of vertices of the circulant digraph and "a1" and "a2" are, respectively, a first jump size and a second jump size of the directed edges. Hereinafter, throughout this specification, n is used to refer to the number of vertices and a1 and a2 are used to refer to the first jump size and second jump size.

Figure 5:
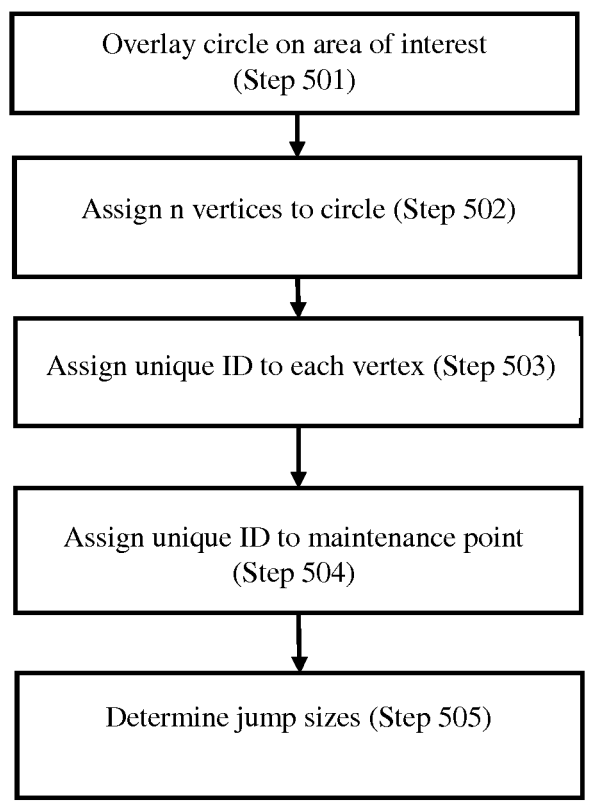
FIG. 5 is a flowchart illustrating steps for a method of constructing a circulant digraph, in accordance with one illustrative embodiment of the invention.

FIG. 5 is a flowchart illustrating steps for a method of overlaying a circulant digraph on an area of interest, in accordance with an illustrative embodiment of the invention.

In step 501, a circle is overlayed a circle on the area of interest 18. The circle may be received at the computer device 160 as an input similar to the inputs received for the area of interest. An operator may overlay the circle on the area of interest using a GUI and a displayed model or map of the area of interest. In an alternative embodiment of the invention, the computer device 160 may determine an optimal circle through an iterative operation to maximize one or more parameters, such as the coverage over the area of interest 18. For example, the control station 16 may overlay the circle in a portion of the area of interest 18 that will allow the greatest circumference of the circle.

In step 502, n vertices are assigned on the circle. To ensure collisionless flight, the control station 16 selects a number of vertices such that it is greater than the number of UAVs 12 and is divisible by the number of UAVs 12, hereinafter also referred to as "k" throughout this specification. The vertices are uniformly distributed on the overlayed circle such that all adjacent vertices are equidistant to each other.

In step 503, the control station 16 assigns a unique ID to each of the n vertices. The vertices are assigned IDs sequentially from zero to n−1.

In step 504, the control station 16 assigns a unique ID to the maintenance site. The maintenance site is assigned the ID "n". The maintenance point 14 may be an existing facility or structure or it may be a temporary location assigned at the control station 16.

In step 505, the control station 16 determines the first jump size and the second jump size. To ensure collisionless flight, the first jump and the second jump are selected to be one and one less than the number of UAVs (k−1). In the embodiments shown herein, the first jump, a1, is selected to be one and the second jump, a2, is selected to be one less than the number of UAVs 12. In other embodiments, this order may be reversed. As such, each vertex of the circulant digraph, points to vertices one jump away and k−1 jumps away. Which is to say that for each vertex $v_i$, the vertex points to vertices of $v_{i+a1}$ and $v_{i+a2 \pmod n}$.

Figure 6:
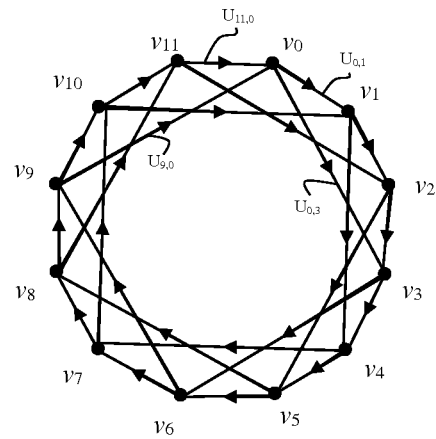
FIG. 6 is a circulant digraph with twelve vertices, in accordance with one illustrative embodiment of the invention.

FIG. 6 is a circulant digraph with twelve vertices, in accordance with one illustrative embodiment of the invention. The circulant digraph shown in FIG. 6 is an example of a circulant digraph which is suitable for collisionless flight of four UAVs 12. In this embodiment, $G=G_{12}(1,3)$. Accordingly, the circulant digraph comprises a first vertex $v_0$, a second vertex $v_1$, a third vertex $v_2$, a fourth vertex $v_3$, a fifth vertex $v_4$, a sixth vertex $v_5$, a seventh vertex $v_6$, an eighth vertex $v_7$, a ninth vertex $v_8$, a tenth vertex $v_9$, an eleventh vertex $v_{10}$ and a twelfth vertex $v_{11}$. The first jump size is one and the second jump size is three. Each of the twelve vertices has directed edges, or arcs, pointing to vertices that are one jump away and vertices that are three jumps away. For example, the vertex $v_0$ is connected to vertex $v_1$ by directed edge $u_{0,1}$ and to vertex $v_3$ by $u_{0,3}$. Vertex $v_9$ points to vertex $v_0$ by directed edge $u_{9,0}$ and vertex $v_{11}$ points to vertex $v_0$ by directed edge $u_{9,0}$.

Figure 7:
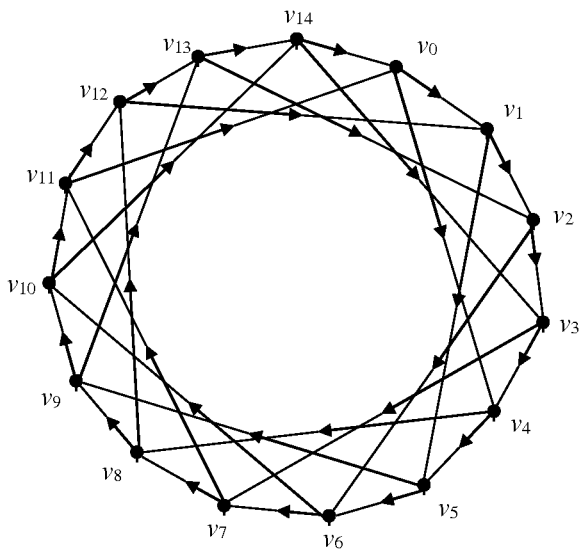
FIG. 7 is a circulant digraph with fifteen vertices, in accordance with one illustrative embodiment of the invention.

FIG. 7 is a circulant digraph with fifteen vertices, in accordance with one illustrative embodiment of the invention. The circulant digraph shown in FIG. 7 is an example of a circulant digraph suitable for collisionless flight of five UAVs 12. In this embodiment, $G=G_{15}(1,4)$. Accordingly, the circulant digraph comprises fifteen vertices. Each of the vertices has directed edges connecting the vertex to vertices one jump away and directed edges connecting the vertex to vertices four jumps away. For example, the vertex $v_0$ is connected to vertex $v_1$ by directed edge $u_{0,1}$ and to vertex $v_4$ by $u_{0,4}$. Additionally $u_{11,0}$ is directed toward vertex $v_0$ from vertex $v_{11}$ and $u_{14,0}$ is directed toward vertex $v_0$ from vertex $v_{14}$.

Given the number of UAVs 12 and the circulant digraph, each of the UAVs 12 is assigned to an induced directed cycle in G in such a way that each directed edge of the circulant digraph will be assigned to a single unique UAV 12 and each vertex of the circulant digraph will be visited by a unique pair of UAVs 12 implied by its two incoming edges. As will be described in further detail below, each vertex corresponds to two waypoints in three-dimensional space, a high altitude waypoint and a low altitude waypoint, such that the pair of UAVs 12 do not collide at the vertex. Advantageously, each vertex being visited by a unique pair assures that if a single UAV 12 is lost, the coverage of all vertices in G will remain unchanged. The system is resilient to any single UAV 12 failure.

Figure 8:
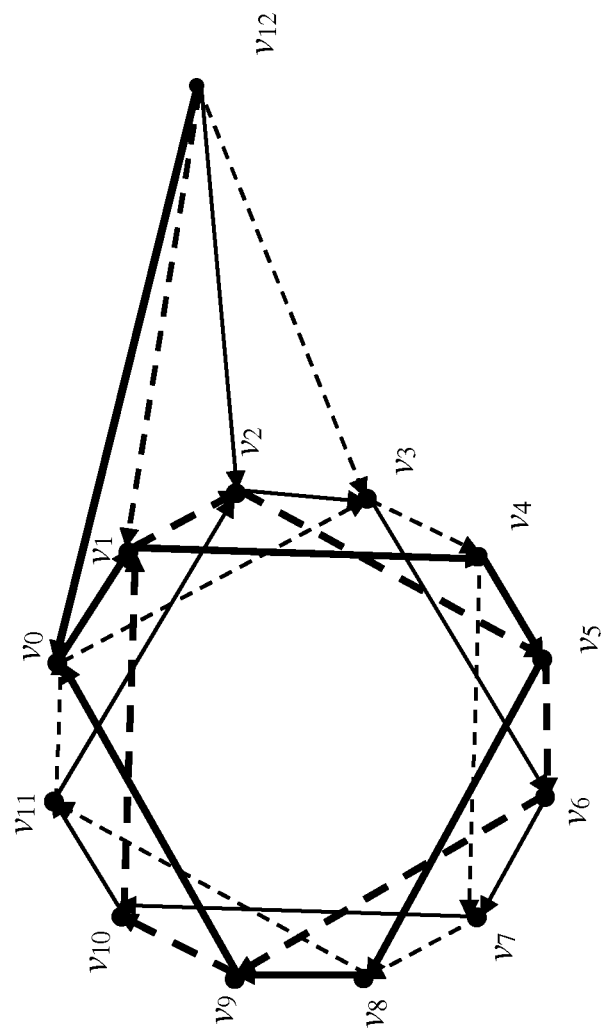
FIG. 8 is a two dimensional representation of the flight paths of four UAVs, in accordance with one illustrative embodiment of the invention.

FIG. 8 is a two dimensional representation of the flight paths of four UAVs, in accordance with one illustrative embodiment of the invention. The circulant graph shown in FIG. 8 is of the form $G=G_{12}(1,3)$ and comprises four independent directed cycles. Accordingly, four UAVs 12 can be assigned collisionless flight paths over an area covered by the circulant digraph.

The first independent cycle includes directed edges $u_{0,3}$, between vertices $v_0$ and $v_3$, $u_{3,6}$ between vertices $v_3$ and $v_6$, $u_{6,9}$ between vertices $v_6$ and $v_9$ and $u_{9,0}$ between vertices $v_9$ and $v_0$. The second independent cycle includes directed edges $u_{1,4}$, between vertices $v_1$ and $v_4$, $u_{4,7}$ between vertices $v_4$ and $v_7$, $u_{7,10}$ between vertices $v_7$ and $v_{10}$ and $u_{10,1}$ between vertices $v_{10}$ and $v_1$. The third independent cycle includes directed edges $u_{2,5}$, between vertices $v_2$ and $v_5$, $u_{5,8}$ between vertices $v_5$ and $v_8$, $u_{8,11}$ between vertices $v_8$ and $v_{11}$ and $u_{11,2}$ between vertices $v_{11}$ and $v_2$. The fourth independent cycle includes directed edges $u_{3,6}$, between vertices $v_3$ and $v_6$, $u_{6,9}$ between vertices $v_6$ and $v_9$, $u_{9,12}$ between vertices $v_9$ and $v_{12}$ and $u_{12,3}$ between vertices $v^{12}$ and $v_3$.

In step 403, the control station 16 assigns a waypoint to each of the vertices of the circulant digraph. For each vertex, the control station 16 assigns to waypoints corresponding to their coordinates, a first waypoint at a first altitude and a second waypoint at a second altitude. Further, a waypoint is assigned for the maintenance point 14.

The circulant digraph shown in FIG. 8 is a two-dimensional model of the flight paths for the UAVs 12. In three dimensions, each of the vertices corresponds to two waypoints having the same latitude and longitude but differing altitudes. Each of the vertices corresponds to a waypoint at a first altitude and a waypoint at a second altitude. The first altitude and the second altitude are predefined and constant across each vertex. The first altitude and the second altitude may be input to the computer device 16 from a user or selected by the computer device based on one or more parameters such as topography of the area of interest, operational limitations of the UAV, fuel consumption of the UAV, presence and operational range of hostile countermeasures.

To ensure collisionless flight, while flying from waypoint to waypoint, each of the UAVs 12 alternates between a high altitude waypoint and a low altitude waypoint. For example, the UAV 12 may fly jumps of size a1 from a low waypoint to a high waypoint and jumps of size a2 from a high waypoint to a low waypoint. Due to the alternating altitudes of contiguous waypoints in the flight path and the geometric properties of circulant digraphs, the UAVs 12 will not collide despite two UAVs 12 visiting the same vertex and the presence of crossing arcs in the circulant digraph.

Figure 9A:
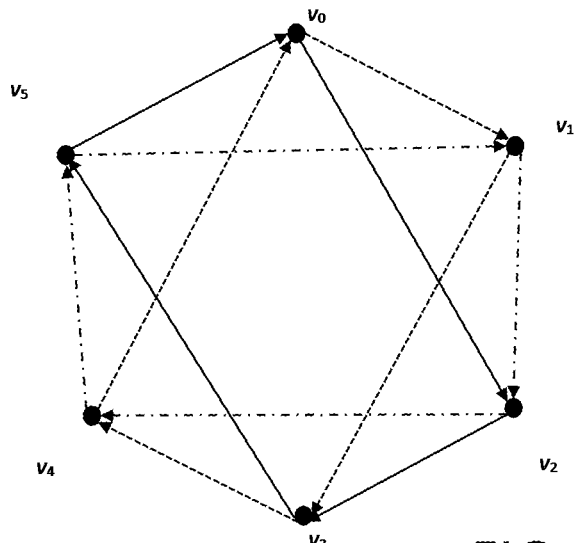
FIG. 9A is a circulant digraph with six vertices, in accordance with one illustrative embodiment of the invention.
Figure 9B:
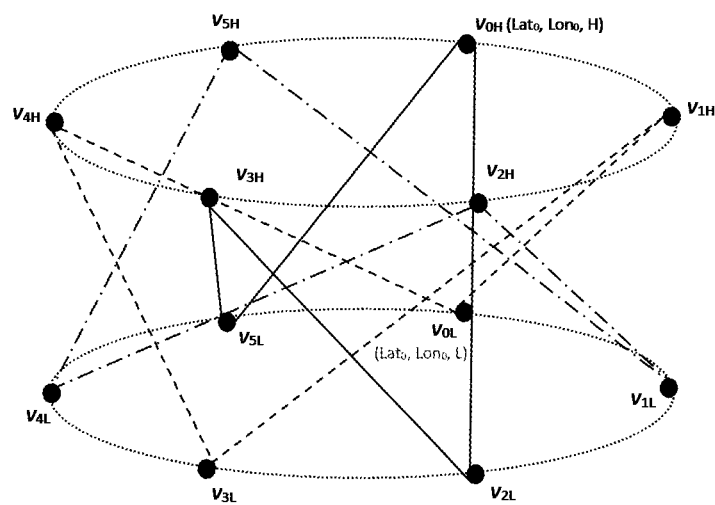
FIG. 9B illustrates the flight paths of three UAVs, in accordance with one illustrative embodiment of the invention.

FIG. 9A is a circulant digraph with six vertices, in accordance with an illustrative embodiment of the invention. FIG. 9B illustrates the flight paths of three UAVs, in accordance with one illustrative embodiment of the invention. The circulant digraph of FIG. 9A is of the form $G=G_6(1,2)$. There are three distinct directed cycles of the circulant digraph, and therefore three collisionless flight paths that may be flown based on the circulant digraph. For simplicity, the waypoint and directed edges corresponding to the maintenance point 14 have been omitted and the flight paths shown only include the cycles corresponding to the circulant digraph.

The three collisionless flight paths are comprised of twelve total waypoints, six waypoints at a low altitude at each vertex of the circulant digraph and six waypoints at a high altitude at each vertex. Each waypoint is defined by three coordinates, a latitude coordinate, a longitude coordinate and an altitude coordinate. For example, vertex $v_0$ has two corresponding waypoints assigned from it, a first waypoint, $v_{0H}$, at (lat$_0$, lon$_0$, H) and a second waypoint $v_{0L}$ at (lat$_0$, lon$_0$, L).

Each of three UAVs 12 is assigned to one of the three distinct flight paths. For example, a first UAV 12 is assigned to a first flight path comprising a path from waypoint $v_{0L}$ at (lat$_0$, lon$_0$, L) to waypoint $v_{0H}$ at (lat$_1$, lon$_1$, H) to waypoint $v_{3L}$ at (lat$_3$, lon$_3$, L) to waypoint $v_{4H}$ at (lat$_4$, lon$_4$, H) and back to waypoint $v_{0L}$ at (lat$_0$, lon$_0$, L) to complete the cycle.

Each of the UAVs 12 starts and ends at the maintenance point 14. The UAV 12 flies in the cycle around the circulant digraph until the mission is completed, more fuel or energy is required or when a return to the maintenance point is required for another reason, such as to receive updated waypoints from the control station 16. Accordingly, the full flight path of a UAV 12 comprises starting at the maintenance point 14, flying from the maintenance point 14 to a first waypoint of the flight path, flying one or more cycles corresponding to a directed cycle of the circulant digraph and then returning to the maintenance point.

In step 404, the control station 16 assigns an ID to each UAV 12. The UAVs 12 are assigned a value sequentially from zero to k−1. The ID, unique among UAVs, is employed by the UAV 12 in conjunction with the unique IDs of the vertices and the maintenance point 14 to determine its flight path according to autonomous flight rules executed by the UAV 12.

In step 405, the unique ID and waypoint IDs and coordinates are transmitted to the UAVs 12. The control station 16 transmits the IDs and waypoints wirelessly to the UAVs 12 via the communication interface. The UAVs 12 store the IDs and waypoints in one or more databases residing in nonvolatile memory.

In step 406, each UAV 12 flies according to autonomous flight control rules based on the UAV ID and the waypoint IDs and coordinates.

In an embodiment of the invention, the autonomous flight control rules are represented as firmware stored in nonvolatile storage of the UAV 12 and executed by the CPU in conjunction with the main memory. The firmware may be uploaded to the UAV 12 by the control station 16 either subsequent to or prior to any of steps 401 through 404. Alternatively, the UAVs 12 may be preprogrammed with the autonomous flight rules control at manufacture or some other time prior to deployment.

In an embodiment of the invention, each UAV's flight control firmware directs the UAV 12 to fly over the circulant digraph as modeled over the area of interest from the maintenance node, $v_n$, in the following sequence: $v_n$, $v_i$, a1, a2, a1, a2, a1, a2, a1, a2 . . . a1, a2, $v_i$, $v_n$. Hereinafter "$v_i$" refers to the vertex, and accordingly, the waypoints having the same ID as the UAV. For example, a UAV assigned to zero, UAV$_0$, will fly from the maintenance point 14 to the waypoint corresponding to vertex, $v_0$ to begin its flight path. The UAV assigned to two, UAV$_2$, flies from the maintenance point 14 to the waypoint corresponding to vertex, $v_2$, to begin its flight path, and so forth.

Each UAV 12 starts at the altitude of the maintenance point 14, hereinafter also referred to as Z, and flies to a first altitude at its starting vertex, vi. Between vertices, the UAVs 12 alternate flying from a first altitude, "L" to a second altitude "H". In an embodiment of the invention, each UAV 12 initially flies from the maintenance altitude to a low altitude and then subsequently flies from a low altitude to a high altitude when it flies a leg of the first jump size and from a high altitude to a low altitude when flying a leg of the second jump size. Using the example above, the UAV 12 would fly the following sequence of altitudes: Z, L, H, L . . . Z.

Figure 10:
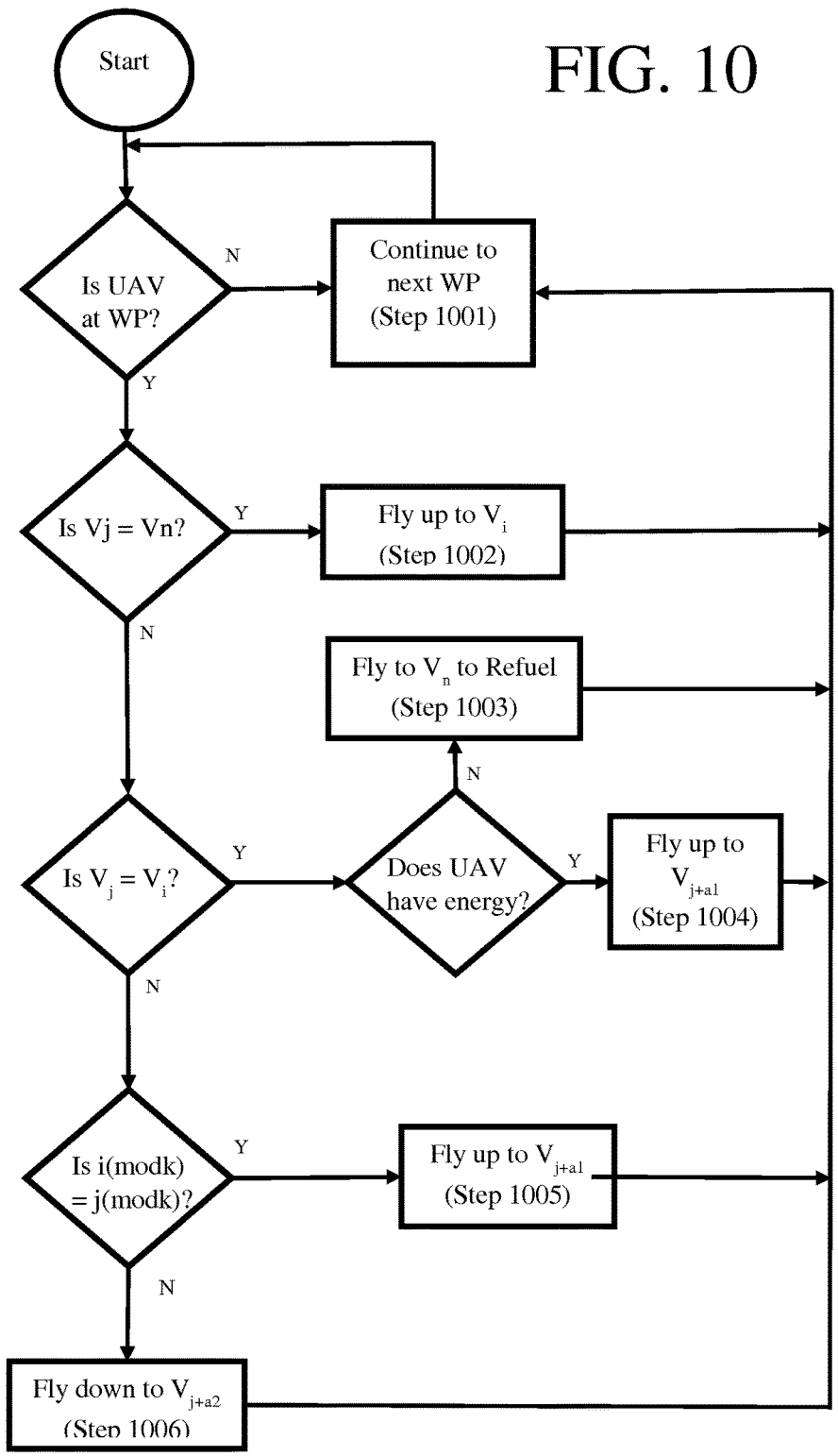
FIG. 10 is a flowchart illustrating steps for autonomously flying a UAV according to flight rules, in accordance with one illustrative embodiment of the present invention.

FIG. 10 is a flowchart illustrating steps for a method of flying a UAV, in accordance with an illustrative embodiment of the invention. In the flowchart shown in FIG. 10, vj denotes the waypoint at which the UAV 12 is currently flying.

In step 1001, if the UAV 12 is not at a waypoint, the UAV 12 continues to the next waypoint.

If the UAV 12 is at a waypoint, the UAV 12 determines if the current waypoint, hereinafter also referred to as "$v_j$", is the maintenance point, $v_n$. If the waypoint is the maintenance point 14, the UAV 12 flies up from $v_n$ to $v_i$ at a low altitude. This corresponds to flight from the coordinate ($lat_n$, $lon_n$, Z) to the coordinate ($lat_i$, $lon_i$, L). Referring back to FIG. 8, using a first UAV (i.e. $UAV_0$) as an example, $UAV_0$ would fly from the maintenance point 14 to vertex$_{0L}$ at waypoint coordinate ($lat_0$, $lon_0$, L) along the directed edge $u_{n,0}$.

If the waypoint is not at the maintenance point 14, the UAV 12 determines if the UAV 12 is at its starting waypoint on the directed cycle. If the waypoint is at its starting waypoint (i.e. $v_j=v_i$), the UAV 12 next determines whether it has sufficient energy to complete another cycle. If the UAV 12 does not have sufficient energy to complete another cycle, in step 1003, the UAV 12 returns to the maintenance point 14 to refuel. Using $UAV_0$ as an example, this corresponds to flying from coordinate ($lat_0$, $lon_0$, L) to coordinate ($lat_n$, $lon_n$, Z).

If the waypoint is at its starting waypoint and does have enough energy to complete another cycle, in step 1003, the UAV 12 flies up to a waypoint one jump ahead. This corresponds to flying from coordinate ($lat_i$, $lon_i$, L) to coordinate ($lat_{i+a1}$, $lon_{i+a1}$, H). Continuing to use $UAV_0$ as an example, the UAV 12 would fly from the waypoint corresponding to vertex v0 at a low altitude ($lat_0$, $lon_0$, L) to the waypoint corresponding to vertex v1 at a high altitude ($lat_1$, $lon_1$, H).

If the waypoint is not at the maintenance point 14 or at its starting point, the UAV 12 must determine if i(modk) is equal to j(modk). If i(modk) is equal to j(modk), at step 1005, the UAV 12 flies up to a waypoint one jump ahead. This corresponds to flying from coordinate ($lat_i$, $lon_i$, L) to coordinate ($lat_{i+a1}$, $lon_{i+a1}$, H). Continuing to use $UAV_0$ as an example, the UAV 12 would fly from the waypoint corresponding to vertex $v_4$ at a low altitude ($lat_4$, $lon_4$, L) to the waypoint corresponding to vertex $v_5$ at a high altitude ($lat_5$, $lon_5$, H).

If i(modk) is not equal to j(modk), at step 1006, the UAV 12 flies down to a waypoint a second jump size, or a2, ahead. This corresponds to flying from coordinate ($lat_i$, $lon_i$, H) to coordinate ($lat_{i+a2}$, $lon_{i+a2}$, L). For example at $v_1$, $UAV_0$ would fly from the waypoint corresponding to vertex $v_1$ at a high altitude ($lat_1$, $lon_1$, H) to the waypoint corresponding to vertex $v_4$ at a low altitude ($lat_4$, $lon_4$, L).

The preceding steps may be summarized in the following five rules. Each of the UAVs 12 is programmed with the following five flying rules.

First, if UAV(i) is in waypoint $v_j$, and j is equal to n then it flies up from $v_n$ to $v_i$ via $u_{n,i}$. This corresponds to flight from waypoint ($lat_n$, $lon_n$, Z) to waypoint ($lat_i$, $lon_i$, L).

Second, if UAV(i) is in waypoint $v_j$ and i≡j(modk) and i doesn't equal j, the UAV 12 flies up from vertex $v_j$ to vertex $v_{j'}$, where j'≡j+a1(modk). This corresponds flight from waypoint ($lat_j$, $lon_j$, L) to waypoint ($lat_{j'}$, $lon_{j'}$, H).

Third, if UAV(i) is in waypoint $v_j$ and i=j and the UAV 12 has enough energy to fly another loop around the circulant digraph, then the UAV 12 flies up from vertex $v_j$ to vertex $v_{j'}$, where j'≡j+a1(modk). This corresponds to flight from waypoint ($lat_j$, $lon_j$, L) to waypoint ($lat_{j'}$, $lon_{j'}$, H).

Fourth, if UAV(i) is in waypoint $v_j$ and i doesn't equal j(modK) and j doesn't equal n, then the UAV 12 flies down from vertex $v_j$ to vertex $v_{j'}$, where j'≡j+a2(modk). This corresponds to flying from waypoint ($lat_j$, $lon_j$, H) to waypoint ($lat_{j'}$, $lon_{j'}$, L).

Finally, if UAV(i) is in waypoint $v_j$ and i=j but the UAV 12 does not have enough energy to complete another loop around circulant digraph, then the UAV 12 flies from vertex $v_j$ to vertex $v_n$.

Advantageously, each of the UAVs 12 is programmed with the same autonomous flight control rules. The UAV 12 IDs and waypoint IDs which are assigned at mission time control the individual flight paths. Therefore the system allows for scalable to systems involving large amounts of UAVs, such as swarms of UAVs 12 numbering in the thousands.

In an alternate embodiment of the invention, instead of flying to fixed altitudes, the UAV 12 flies to the next waypoint at a predetermined angle of ascent or descent. In this alternate embodiment, the autonomous flight rules are summarized as follows:

First, if UAV(i) is in waypoint $v_j$, and j is equal to n then it flies up from $v_n$ to $v_i$ via $u_{i,n}$ at a first angle. This corresponds to flight from waypoint ($lat_n$, $lon_n$, Z) to waypoint ($lat_i$, $lon_i$, L).

Second, if UAV(i) is in waypoint $v_j$ and i≡j(modk) and i doesn't equal j, the UAV 12 flies up from vertex $v_j$ to vertex $v_{j'}$, where j'≡j+a1(modk) at a second angle. This corresponds flight from waypoint ($lat_j$, $lon_j$, L) to waypoint ($lat_{j'}$, $lon_{j'}$, H).

Third, if UAV(i) is in waypoint $v_j$ and i=j and the UAV 12 has enough energy to fly another loop around circulant digraph, then the UAV 12 flies up from vertex $v_j$ to vertex $v_{j'}$, where j'≡j+a1(modk) at the second angle. This corresponds to flight from waypoint ($lat_j$, $lon_j$, L) to waypoint ($lat_{j'}$, $lon_{j'}$, H).

Fourth, if UAV(i) is in waypoint $v_j$ and i doesn't equal j(modK) and j doesn't equal n, then the UAV 12 flies down from vertex $v_j$ to vertex $v_{j'}$, where j'≡j+a2(modk) at a third angle. This corresponds to flying from waypoint ($lat_j$, $lon_j$, H) to waypoint ($lat_{j'}$, $lon_{j'}$, L).

Finally, if UAV(i) is in waypoint $v_j$ and i=j but the UAV 12 does not have enough energy to complete another loop around the circulant digraph, then the UAV 12 flies from vertex $v_j$ to vertex $v_n$ at a fourth angle. This corresponds to flight from waypoint ($lat_j$, $lon_j$, L) to waypoint ($lat_n$, $lon_n$, Z).

In another embodiment, the control station 16 may assign the sequence of waypoints to the UAV 12.

In an embodiment of the invention, the vertices of the circulant digraph and therefor their corresponding waypoints may be updated to change the coverage area. While the original circulant digraph may be a good starting model to ensure collisionless flight, many areas of interest may be irregular shapes which do not conform to a circular flight pattern. Additionally, the area of interest may change. The coverage area may be changed to increase coverage or for a variety of other reasons such as to respond to changed conditions or a changed mission scope.

If there is an update to the waypoints, the control station 16 determines if the UAVs 12 are at the maintenance point 14. In an embodiment of the invention, the UAVs 12 transmit their coordinates to the control station 16 periodically, at one or more waypoints or upon a request signal from the control station. If the UAVs 12 are not at the maintenance point 14, at step 407, the control station 16 directs the UAVs 12 to return to the maintenance point 14. In an embodiment of the invention, the control station transmits a return signal to the UAVs via the communication interface.

Once the UAVs 12 are at the maintenance point 14, at step 408, the control station 16 transmits the updated waypoints to the UAVs 12 via the communication interface.

The waypoints may be updated by a user, such as by manually manipulating a displayed map via a graphic user interface. For example, in this embodiment, the user may drag and drop vertices of the circulant digraph to an updated location. In an alternative embodiment, the waypoints may be updated by the computing device executing a program for updating the waypoints. In this alternate embodiment, the computing device may iteratively test a range of updated waypoints to maximize one or more variables such as area of coverage.

The waypoints may be updated prior to initial flight of the UAVs 12 or updated during UAV 12 flight. For example, the circulant digraph may be employed as a starting model and the vertices are updated prior to deployment of the UAVs. Alternatively, the area of interest or one or more parameters may change during the UAV mission which requires waypoints to be updated.

Figure 11:
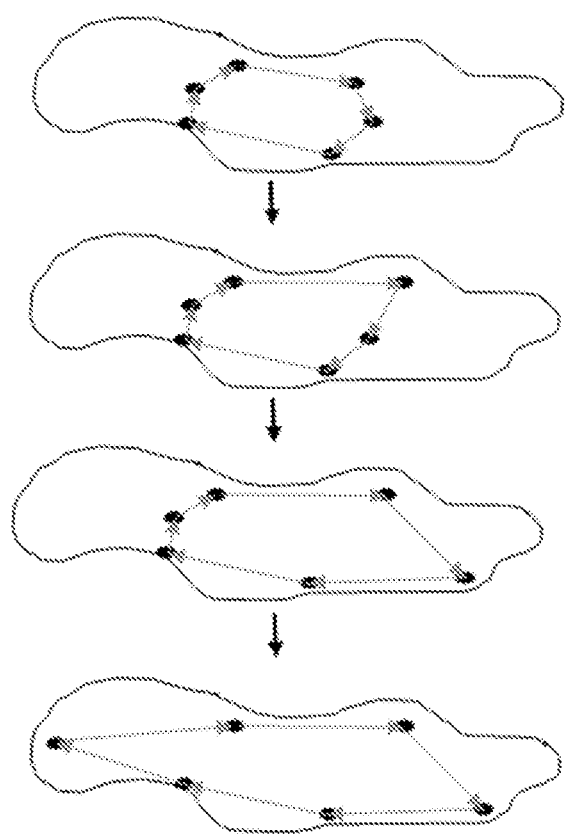
FIG. 11 is a series of digraphs illustrating successive updates of waypoints, in accordance with an illustrative embodiment of the invention.

FIG. 11 is a series of digraphs illustrating successive updating of waypoints. As shown in FIG. 11, the area of interest 18 is an irregular shape that does not conform to a circle. The vertices of the circulant digraph are progressively updated to conform closer to and cover more of the area of interest 18. The update process results in a digraph more closely approximating the area of interest 18 as shown in the final sequence.

In an embodiment of the invention, the control station 16 displays an image or model of the area of interest 18 with the circulant digraph overlayed. The operator may then manipulate one or more of the vertices of the circulant digraph to update the coverage area Vertices of the circulant digraph may be displayed as selectable icons which a user may drag to create an updated digraph.

To ensure collisionless flight, the updated digraph must meet two conditions: it must pass a convexity test and it must pass an isosceles avoidance test. After each modification to the digraph, the digraph is tested for each of these two conditions.

Figure 12:
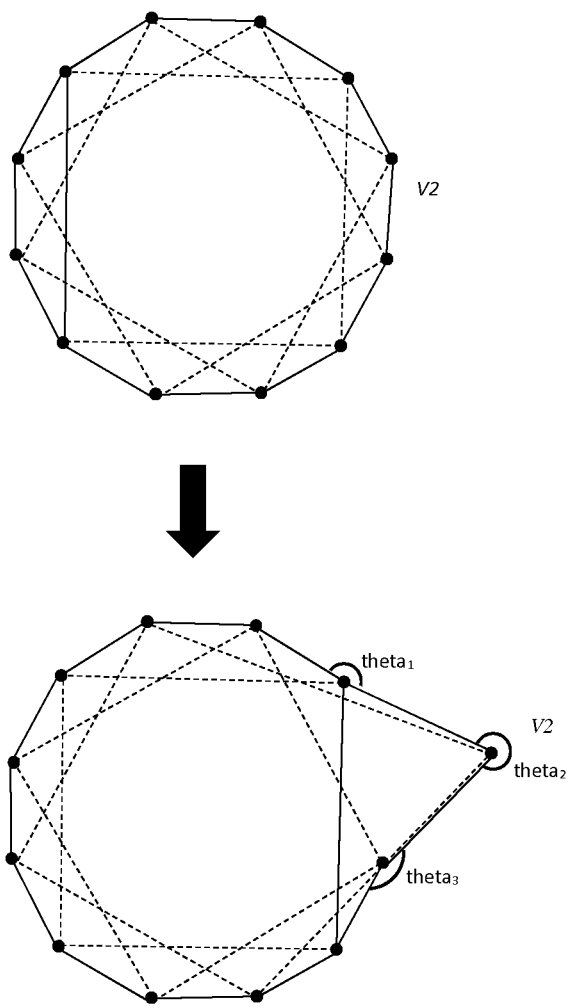
FIG. 12 is a diagram illustrating a convexity test on updated waypoints, in accordance with one illustrative embodiment of the invention.

FIG. 12 is a diagram illustrating a convexity test on updated waypoints, in accordance with one illustrative embodiment of the invention. After each vertex is modified, the control station 16 performs a convexity test to confirm that the convexity of the digraph is preserved. The polygon formed by the outside edges of the digraph is convex if it contains all the line segments connecting any pair of its points. Accordingly, the polygon is convex if and only if all turns from one edge vector to the next have the same sense.

In FIG. 12, vertex $v_2$ has been updated to conform more closely to the area of interest 18. The resulting polygon is shown in solid lines. To ensure collisionless flight, this polygon composed of the outer edges of the digraph must remain convex. To test for convexity, the control station 16, determines if the angles of the vertices affected by the modification retain their sense. The affected angles are the angles formed by the outside directed edges pointing to and from the updated vertex as well as the two adjacent vertexes. The control station 16 determines whether a first angle, theta1, a second angle, theta 2, and a third angle, theta 3, are reflex angles or greater than 180 degrees. If the angles are reflex angles, the polygon is convex and the updated digraph meets the first condition of ensuring collisionless flight.

In another embodiment of the invention, the control station 16 may employ another test for convexity. For example, the control station 16 may test to determine whether all internal edges of the digraph are bounded by the outer edges of the digraph. Alternatively, other convexity algorithms are known in the art and may be employed to determine the convexity of the polygon.

Figure 13:
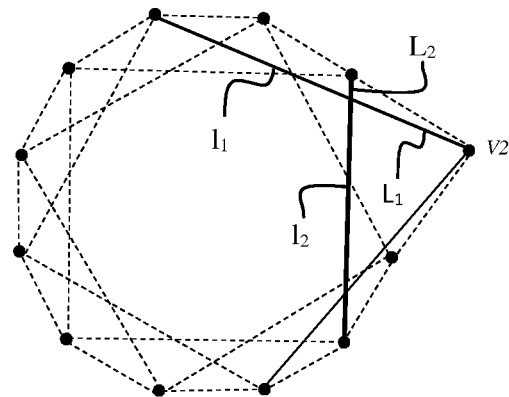
FIG. 13 is a diagram illustrating an isosceles avoidance test on updated waypoints, in accordance with one illustrative embodiment of the invention.

FIG. 13 is a diagram illustrating an isosceles avoidance test on updated waypoints, in accordance with one illustrative embodiment of the invention. To ensure collisionless flight, no crossing arcs in the circulant digraph can form an isosceles triangle at their point of intersection. This is a given when vertices of the circulant digraph are evenly distributed on the edge of a circle due to the properties of circulant digraphs. However, this must be tested individually after each vertex is modified. To ensure this, the digraph must meet an isosceles avoidance test.

FIG. 13 shows the digraph of FIG. 12 in which vertex v2 has been updated. The affected edges are shown in solid line. These two edges, $u_{11,2}$ and $u_{2,4}$ must be tested to ensure that they do not form an isosceles triangle with any edges which cross them. Edge $u_{11,2}$ crosses three other arcs, $u_{1,4}$, $u_{0,3}$ and $u_{9,0}$. To perform an isosceles avoidance test, for each of these three arcs, the control station 16 determines whether the ratio of the line segments formed by the intersection are equal for each arc. In the example shown in FIG. 13, $u_{11,2}$ does not form an isosceles triangle with $u_{1,4}$, so long as L1/11 is not equal to L2/12.

The same test is performed between $u_{11,2}$ and u0,3 and u11,2 and u9,0. Additionally, the same must be performed for arc u2,5 and the three arcs which intersect it (u0,3, u2,5 and u4,7). This isosceles avoidance test must be performed every time a waypoint is updated.

Figure 14:
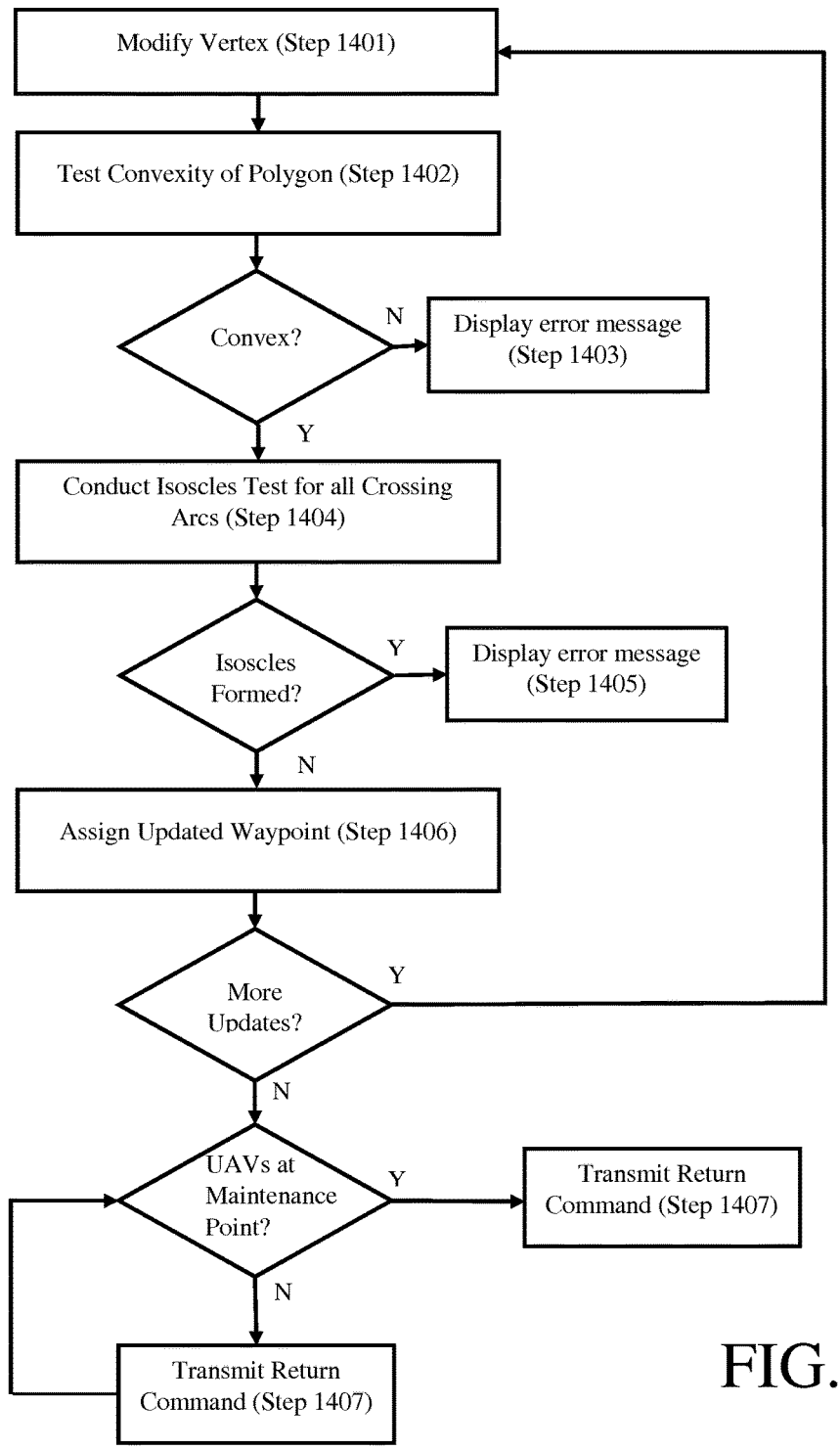
FIG. 14 is a flowchart illustrating steps for updating waypoints for flight paths of UAVs to ensure collisionless flight, in accordance with one illustrative embodiment of the invention.

FIG. 14 is a flowchart illustrating steps for updating waypoints for flight paths of UAVs 12 to ensure collisionless flight, in accordance with one illustrative embodiment of the invention.

In step 1401, an updated digraph is constructed by modifying a vertex. As described above, the vertex may be manually updated by a user via a graphic user interface. The vertex may be updated autonomously by the computing device to maximize one or more factors such as coverage area.

In step 1402, a convexity test is performed on the resulting polygon formed by the outer edges of the updated digraph. To perform the convexity test, for each of the three angles affected by the modified vertex, a value of the exterior angle is computed to determine if the angle is a reflex angle. The affected angles are the angles formed by the outside edges pointing to and from the updated vertex and the two adjacent vertexes.

If the resulting polygon is not convex, in step 1303, an error message is displayed alerting the user that the updated vertex failed the convexity test and the waypoints cannot be updated.

If the resulting polygon is complex, in step 1304, an isosceles avoidance test is performed. To perform the isosceles avoidance test, for each of the interior edges pointing to and away from the updated vertex, it is determined whether any crossing edges form an isosceles triangle with the edge. Each updated edge intersects with three other crossing edges. For each of these six intersections, a ratio of the line segments of the affected edge formed by the intersection is compared to the same ratio for the intersecting edge. If the two ratios are not equal for all six intersections, the two arcs do not form an isosceles triangle and collisionless flight is maintained.

If the ratios are equal for any of the six intersections, in step 1305 an error message is displayed alerting the user that the updated vertex failed the isosceles avoidance test and the waypoints cannot be updated.

If the ratios are not equal for any of the six intersections, in step 1306, the updated vertex is assigned updated corresponding waypoints.

The control station 16 determines if the UAVs 12 are at the maintenance point 14. In an embodiment of the invention, the UAVs 12 transmit their coordinates to the control station 16 periodically, at one or more waypoints or upon a request signal from the control station. If the UAVs 12 are not at the maintenance point 14, at step 1407, the control station 16 directs the UAVs 12 to return to the maintenance point 14. In an embodiment of the invention, the control station transmits a return signal to the UAVs via the communication interface.

Once the UAVs 12 are at the maintenance point 14, at step 1408, the control station 16 transmits the updated waypoints to the UAVs 12 via the communication interface.

While the embodiments described herein refer to unmanned aerial vehicles, the invention is not limited to aerial vehicles and may be applied to any autonomous devices which travel three dimensions according to a flight path. For example, the autonomous devices may be subterranean, surface, air, water or space vehicles or some combination thereof.

We claim:

1. A method for ensuring collisionless flight of three or more unmanned aerial vehicles over an area, wherein the method comprises the steps of:
constructing a circulant digraph representing a portion of the area, wherein the circulant digraph comprises
a number of vertices such that the number of vertices is greater than the number of unmanned aerial vehicles and the number of vertices is divisible by the number of unmanned aerial vehicles and wherein each vertex represents two waypoints at differing altitudes,
a first jump size of one,
a second jump size of one less than the number of unmanned aerial vehicles, and
an independent directed cycle for each of the three or more unmanned aerial vehicles; and
assigning each of the three or more unmanned aerial vehicles a flight path corresponding to an independent directed cycle of the circulant digraph.

2. The method of claim 1 wherein the flight path for each unmanned aerial vehicle comprises a starting waypoint and two or more subsequent waypoints alternating between the first jump size and the second jump size.

3. The method of claim 2 wherein the starting waypoint of each flight path is at a first altitude and the two or more subsequent waypoints of the flight path alternate between a second altitude and the first altitude.

4. The method of claim 1 further comprising the step of assigning a waypoint to a maintenance point outside of the circulant digraph.

5. The method of claim 4 further comprising the steps of:
assigning a unique vertex ID to each vertex and the maintenance point; and
assigning a unique unmanned aerial vehicle ID to each unmanned aerial vehicle.

6. The method of claim 4 further comprising the step of:
flying each unmanned aerial vehicle from the maintenance point to the starting waypoint of its respective flight path.

7. The method of claim 1 further comprising the steps of:
constructing an updated digraph by modifying one or more vertices of the circulant digraph; and
updating the flight path of the three or more unmanned aerial vehicles according to the modified one or more vertices.

8. The method of claim 7 further comprising the step of performing a convexity test on the updated digraph.

9. The method of claim 7 further comprising the step of performing an isosceles avoidance test on the updated digraph.

10. The method of claim 7 wherein the step of updating the flight path of the unmanned aerial vehicles according to the modified one or more vertices further comprises the step of returning each unmanned aerial vehicle to the maintenance point.

11. A system for ensuring collisionless flight of three or more unmanned aerial vehicles over an area comprising
three or more unmanned vehicles, wherein each of the three or more unmanned vehicles is assigned a flight path corresponding to an independent directed cycle of a circulant digraph representing a portion of the area and wherein the circulant digraph further comprises:
a number of vertices such that the number of vertices is greater than the number of unmanned aerial vehicles and the number of vertices is divisible by the number of unmanned aerial vehicles and wherein each vertex represents two waypoints;
a first jump size of one; and
a second jump size of one less than then number of unmanned aerial vehicles.

12. The system of claim 11 wherein each of the three or more unmanned aerial vehicles comprises a central processing unit, a memory and a location sensor.

13. The system of claim 11 wherein each of the three or more unmanned aerial vehicles comprises a communication interface configured for receiving information comprising updated waypoints.

14. The system of claim 11 further comprising a maintenance point and wherein each flight path of the three or more unmanned aerial vehicles begins and ends at the maintenance point.

15. The system of claim 11 wherein the each vertex of the circulant digraph corresponds to a waypoint at a first altitude and a waypoint at a second altitude and each flight path of the three or more unmanned aerial vehicles comprises waypoints alternating between the first altitude and the second altitude.

16. The system of claim 11 further comprising a control station comprising a graphic user interface configured for displaying a representation of the circulant digraph over the area and receiving information for updating one or more vertices of the digraph.

17. The system of claim 16 wherein the control station is further configured for performing a convexity test on an updated digraph.

18. The system of claim 16 wherein the control station is further configured for performing an isosceles avoidance test on an updated digraph.

19. The system of claim 11 wherein each of the unmanned aerial vehicles further comprises a sensor element configured for sensing one or more characteristics of the portion of the area of interest.

20. The system of claim 19 wherein the sensor element is an infrared image sensor configured for sensing infrared radiation of the portion of the area of interest.

* * * * *